US007380089B2

(12) United States Patent
Herger et al.

(10) Patent No.: US 7,380,089 B2
(45) Date of Patent: May 27, 2008

(54) SYSTEM AND METHOD FOR MANAGING MEMORY COMPRESSION TRANSPARENT TO AN OPERATING SYSTEM

(75) Inventors: Lorraine M. Herger, Portchester, NY (US); Mary McHugh, Newtown, CT (US); Dan E Poff, Mahopac, NY (US); Robert A. Saccone, Jr., Glenhead, NY (US); Charles O. Schulz, Ridgefield, CT (US); T. Basil Smith, III, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 11/057,083

(22) Filed: Feb. 11, 2005

(65) Prior Publication Data

US 2005/0198460 A1 Sep. 8, 2005

Related U.S. Application Data

(63) Continuation of application No. 09/782,495, filed on Feb. 13, 2001, now Pat. No. 6,877,081.

(51) Int. Cl.
*G06F 12/06* (2006.01)
(52) U.S. Cl. ....................... 711/170; 711/156
(58) Field of Classification Search ................ 711/171, 711/170, 172, 154, 114, 112, 202, 113, 111; 710/68, 56; 709/247
See application file for complete search history.

(56) References Cited

U.S. PATENT DOCUMENTS 5,237,675 A 8/1993 Hannon, Jr.

(Continued)

FOREIGN PATENT DOCUMENTS

JP 8-44498 2/1996

(Continued)

OTHER PUBLICATIONS

Bulent Abali, et al., "Performance of Hardware Compressed Main Memory", HPCA '01, pp. 73-81, IEEE, 2001.

(Continued)

*Primary Examiner*—Pierre-Michel Bataille
(74) *Attorney, Agent, or Firm*—Scully, Scott, Murphy & Presser, P.C.; Derek S. Jennings

(57) ABSTRACT

In a computer system having an operating system and a compressed main memory defining a physical memory and a real memory characterized as an amount of main memory as seen by a processor, and including a compressed memory hardware controller device for controlling processor access to the compressed main memory, there is provided a system and method for managing real memory usage comprising: a compressed memory device driver for receiving real memory usage information from the compressed memory hardware controller, the information including a characterization of the real memory usage state: and, a compression management subsystem for monitoring the memory usage and initiating memory allocation and memory recovery in accordance with the memory usage state, the subsystem including mechanism for adjusting memory usage thresholds for controlling memory state changes. Such a system and method is implemented in software operating such that control of the real memory usage in the computer system is transparent to the operating system.

14 Claims, 3 Drawing Sheets

U.S. PATENT DOCUMENTS

| | | | |
|---|---|---|---|
| 5,481,701 A * | 1/1996 | Chambers, IV | 707/101 |
| 5,559,978 A | 9/1996 | Spilo | |
| 5,699,539 A | 12/1997 | Garber et al. | |
| 5,761,536 A | 6/1998 | Franaszek | |
| 5,864,859 A | 1/1999 | Franaszek | |
| 6,000,009 A | 12/1999 | Brady | |
| 6,092,171 A | 7/2000 | Relph | |
| 6,298,370 B1 * | 10/2001 | Tang et al. | 718/102 |
| 6,516,397 B2 | 2/2003 | Roy et al. | |
| 6,564,305 B1 | 5/2003 | Moore | |
| 6,681,305 B1 | 1/2004 | Franke et al. | |

FOREIGN PATENT DOCUMENTS

| | | |
|---|---|---|
| JP | 10-312297 | 11/1998 |
| JP | 2002-24082 | 1/2002 |
| WO | WO 99/41668 | 8/1999 |

OTHER PUBLICATIONS

Bulent Abali etal., Performance of Hardware Compressed Main Memory, HPCA '01, pp. 73-81, IEEE, 2001.

* cited by examiner

SYSTEM AND METHOD FOR MANAGING MEMORY COMPRESSION TRANSPARENT TO AN OPERATING SYSTEM

RELATED APPLICATIONS

This application is a continuation of U.S. application Ser. No. 09/782,495, filed Feb. 13, 2001, now U.S. Pat. No. 6,877,081.

BACKGROUND OF THE INVENTION

1. Field of the Invention

This invention relates generally to compressed memory systems, and more specifically, to a software technique for managing and controlling a compressed memory system in a manner transparent to the operating system.

2. Discussion of the Prior Art

In computer systems it is customary that there be one-to-one correspondence between the memory address produced by the processor and a specific area in the physical memory of the system. It is an error for the processor to request access to an address which does not have an associated physical memory area. This limits the operating system and applications to an address space determined by the actual physical memory installed in the system. Modem computer systems have overcome this limitation through the use of virtual memory which implements a translation table (TT) to map program (virtual) addresses to real memory addresses.

With virtual memory the program works in an address space limited only by the processor architecture. It is a function of the operating system to ensure that the data and code a program is currently using is in main memory and that the translation table can map the virtual address to the real address correctly. In a virtual memory system the allocation of memory is most commonly performed by the operating system software. This requires an interrupt of the instruction sequence so that the privileged kernel code can allocate physical memory to the area being accessed so that normal program flow can continue without error. This interrupt and the kernel processing to allocate physical memory requires a significant amount of processing time and upsets the normal pipelining of instructions through the CPU.

There currently exist schemes for reducing operating system process interruptions. For instance, the reference entitled "Design and Analysis of Internal Organizations for Compressed Random Access Memories" by Peter A. Franaszek and John T. Robinson, IBM Research Report RC21146(94535), dated Oct. 28, 1998, describes a low level main memory design for storing compressed data that includes a directory portion and a collection of fixed size blocks which are used to store lines in compressed format. In the memory storage scheme described therein, highly compressible lines may be stored entirely within a directory entry; otherwise, the directory entry points to one or more of the fixed size blocks which are used to store the line in compressed format. The system further makes use of page tables which translate virtual addresses to real addresses which correspond to the location in the directory of the directory entry for the line and which includes information pertaining to blocks holding a compressed line. Specifically, the information in a directory entry includes flags, fragment combining information, and, assuming fixed size entry structure, pointers to one or more fixed size blocks. On a cache miss, the memory controller and decompression hardware finds the blocks allocated to store the compressed line and dynamically decompresses the line to handle the miss. Similarly, when a new or modified line is stored, the blocks currently allocated to the line are made free (if the line currently resides in the RAM), the line is compressed, and then stored in the RAM by allocating the required number of blocks.

Furthermore, U.S. Pat. No. 5,761,536 is directed to a memory organization technique utilizing a compression control device for storing variable length objects (compressed memory) in fixed-size storage blocks by enabling fixed size storage blocks to receive remaining portions (leftover compressed memory pieces or fragments) of variable length objects that take up less than a full fixed-size storage block. The system thus reduces memory fragmentation.

U.S. Pat. No. 5,864,859 is directed to a compression store addressing technique for storing variable length objects (compressed lines, each representing, e.g., ¼ of a page) in fixed size blocks so that accessing an individual line may be accomplished quickly and with little change to existing software. In particular, the beginning of any line within a page may be accessed with a single pointer plus an offset. Associated with the compression store is a list of free or available blocks (free list) which is accessed for enabling variable length object storage.

Commonly-owned, co-pending U.S. patent application Ser. No. 09/627,516 entitled DYNAMIC ALLOCATION OF PHYSICAL MEMORY SPACE describes a mechanism that enables the physical memory to be dynamically allocated in a manner such that the interruption in program flow is eliminated.

As the amount of physical memory in a computer is limited due to cost and space, operating systems (O/S) have employed techniques that enable many concurrently running applications to share a common pool of physical memory. Above-described co-pending U.S. patent application Ser. No. 09/627,516 further describes a mechanism that facilitates the management of memory pools so that the various processes and users share the system resources fairly.

In general, current operating systems use a kernel software component called a Virtual Memory Manager (VMM) to provide an illusion of a flat, contiguous memory space equal to the amount of memory that can be addressed by the processor to running applications. The O/S reserves a portion of the memory space as its own and allows the applications to have access to the rest of the virtual address space. In reality, the applications only have a relatively small portion of their address space in memory and the rest of application data memory is swapped to disk until the application makes reference to the swapped memory. The VMM then swaps in the requested portion of memory.

It follows that in systems with large amounts of physical memory, performance is better since the O/S can allow applications to have larger segments of data resident in memory, thus reducing the need for swapping to and from disk.

In a system where memory compression is employed, the amount of physical memory appears to the O/S to be much greater than is actually installed. The amount of memory presented to the O/S as installed in the computer is called real memory. The ratio of real memory to physical memory is called the boot compression ratio of the computer system. As long as the data that is being contained in the memory remains compressible at a rate greater than or equal to boot compression ratio, the system can run correctly. However, in the case where the compression ratio of the data residing in memory deteriorates to the point of requiring more physical space than is available, software components are employed to throttle back the usage of real memory such that there always is enough physical memory in which to contain the application and O/S data.

This throttling mechanism may be implemented in one of two ways: 1) by modifications to the VMM in the O/S kernel itself; or, 2) a package of software that runs outside of and separate from the O/S.

It would be highly desirable to provide an improved throttling mechanism that is implemented without modifications to the O/S kernal software and operates transparent to the O/S.

SUMMARY OF THE INVENTION

It is an object of the present invention to provide in a computer system having a compressed main memory organization, a system and method for managing memory usage without modifications to the O/S kernal software and operates transparent to the O/S.

It is a further object of the present invention to provide in a computer system having a compressed main memory organization, a system and method for throttling back the usage of real memory such that there always is enough physical memory in which to contain the application and O/S data.

Thus, in accordance with the principles of the invention, for a computer system having an operating system and a compressed main memory defining a physical memory and a real memory characterized as an amount of main memory as seen by a processor, and including a compressed memory hardware controller device for controlling processor access to the compressed main memory, there is provided a system and method for managing real memory usage comprising: compressed memory device driver for receiving real memory usage information from said compressed memory hardware controller, the information including a characterization of said real memory usage state: and, a compression management subsystem for monitoring the memory usage and initiating memory allocation and memory recovery in accordance with the memory usage state, the subsystem including mechanism for adjusting memory usage thresholds for controlling memory state changes.

Advantageously, such a system and method is implemented in software operating such that control of the real memory usage in the computer system is transparent to the operating system.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS

Figure 1:
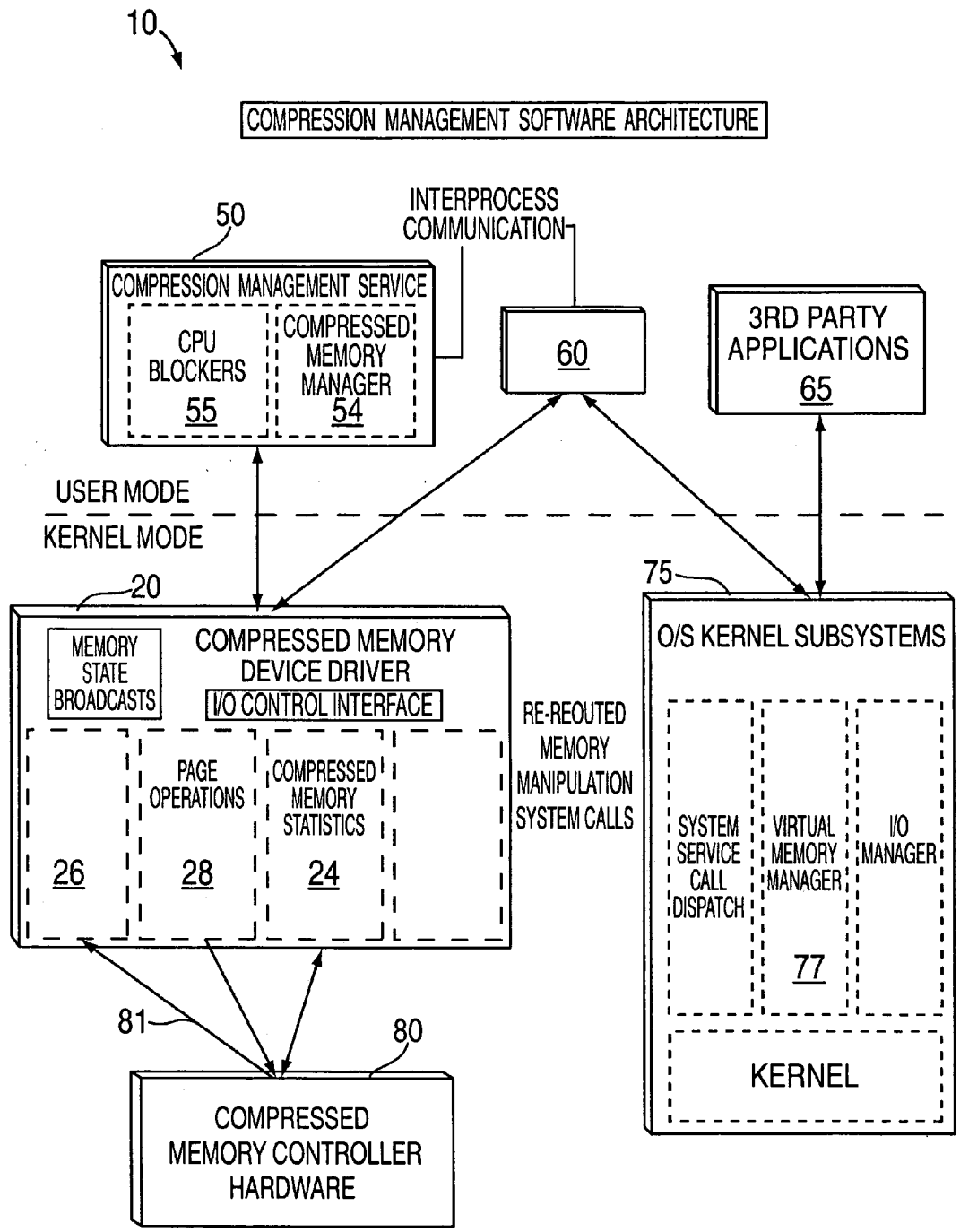
FIG. 1 is a block diagram illustrating the compression management software architecture according to the invention.

The present invention comprises a system and method for throttling memory usage in a compressed memory system. FIG. 1 illustrates a block diagram detailing a generic operating system employing the compression management software architecture 10 according to the present invention.

Particularly, the compression management software architecture 10 of FIG. 1 comprises employs two major software components: 1) a Device Driver 20; and 2) a Compression Management Service ("CMS") 50. The Device Driver component 20 includes a compressed memory statistics module 24 for monitoring and exporting physical memory usage statistics and provides other services related to the compressed memory controller hardware 80. The CMS component 50 is implemented as a high priority process, which monitors real memory usage and the compressibility of the data contained in the real memory.

With more particularity, the compressed memory controller 80, functions as follows: First, it provides for transparent address translation between the real addresses provided by the CPU and the actual locations in physical memory; and, second, it additionally provides an L3 (Level 3) cache of memory in which frequently accessed pages of memory are stored in an uncompressed format. As referred to herein, the term CTT (Compression Translation Table) represents the data structures used by the memory controller to perform the address translation. The CTT itself consumes some portion of the physical memory of the system and must be accounted for in managing the memory. This level of indirection between the real and physical addresses provided by the CTT allows the memory controller to provide a set of fast operations to manipulate memory on the page level granularity. The page operation that is most useful is the Zero Page Operation which allows for memory zeroing by marking the CTT for a particular real memory page as containing all zeros and allows the physical memory associated with that page to be freed and reused. Furthermore, as will be described in greater detail herein, the memory controller additionally functions to generate an interrupt when physical memory usage exceeds a programmable usage threshold.

The CMS component 50 particularly includes a compressed memory management service module 54 which polls a device driver compressed memory statistics module 24, gathers compressed memory usage statistics and, based on these statistics, determines whether or not physical memory must be made available. In the case of deteriorating compressibility and oncoming physical memory exhaustion it will allocate memory from the O/S. Because it is a high priority task, the O/S 75 responds by trimming pages of memory from other lower priority tasks in order to fulfill the request. The pages that are trimmed from the other tasks are written out to the O/S's swap space (not shown) in order to preserve the data contained within them. Upon receiving the memory pages, the CMS will fill them with data that is known to compress into a trivial pattern, i.e., one that compresses to the point of using virtually no physical memory. The result is that the physical memory that was backing the pages is released and may be used elsewhere by the memory controller. The maximum amount of memory that CMS must be prepared to recover is calculated as follows:

$$MaxMemToTakeAway = TR - TP;$$

where "TR" is the Total amount of real memory as seen by the O/S; "TP" is the Total amount of physical memory in the system; and, "MaxMemToTakeAway" is the Total real memory to recover in bytes. It is important that the O/S be configured with enough swap file space to accommodate MaxMemToTakeAway bytes.

The compressed memory controller hardware 80 further generates interrupts 81 when physical memory exceeds a programmable threshold value. Using this capability, the memory system is considered to be in one of the following three states at any given time: 1) a Steady State—where adequate physical memory is available and data is compressing at least at the boot compression ratio; 2) a Warning State—where physical memory is beginning to run low and corrective action should be taken; and 3) an Emergency State—where physical memory is nearing exhaustion, corrective action must be taken and all other applications in the system should be blocked from running until enough physical memory is made available to re-enter the Warning or Steady State.

Aside from polling the memory usage statistics to make corrections, the CMS 50 will receive notifications from the device driver as memory state changes occur. This allows CMS to take corrective action immediately instead of waiting until it is ready to poll again. As a result, the CMS 50 will utilize fewer CPU cycles because memory state change notifications alleviate the need for polling the compressed memory statistics module aggressively.

The CMS 50 additionally is included with functionality for spawning a blocker thread 55 (referred to as a "CPU Blocker") per each CPU in the system. This thread remains suspended and awaits a notification from the device driver that the physical memory is entering the Emergency State. Once the notification is received the CPU Blocker 55 will monopolize the CPU it is bound to and prevent other applications in the system from executing. Correspondingly, this only allows the CMS 50 and its associated tasks to execute. This is necessary because the severity of the Emergency State dictates that other applications cannot be allowed to execute as they can further deteriorate the state of the memory system.

Device Driver Description

With more particularity, the compressed memory controller hardware 80 appears as a peripheral component interconnect (PCI) device and communicates with any other device in the system via the compressed memory device driver 20 which provides a standard set of software services as proscribed by each individual O/S. Application software or O/S software may then communicate with the memory controller hardware using the services of the device driver. According to the preferred embodiment of the invention, the device driver 20 provides the following facilities: 1) provides various memory compression statistics from module 24; 2) from module 26, enables the programming of low physical memory threshold registers on the compressed memory controller 80, which will initiate generation of an interrupt when the value of the threshold register is exceeded; 3) from module 26, broadcasts notification of low physical memory interrupts to interested client applications; and, 4) from module 28, provides access to special memory manipulation functions referred to as "PageOps" that are unique to the memory compression chip. PageOps are so named because they operate on the typical page size (4K), e.g., as used by the Intel x86 architecture.

The CMS 50 interacts with the device driver 20 by sending device I/O control code messages to it.

Low Physical Memory Interrupts

The device driver particularly tracks an internal memory state variable based upon the amount of physical memory in use. The system is considered to be in one of three states (Steady, Warning, or Emergency) at any given time. Each memory state has an associated physical memory usage threshold. A state's threshold is considered to be the transition point between itself and the next memory state. A state's threshold is set by sending a device I/O control code message to the driver. The following rule concerning thresholds must hold true when threshold assignments are made:

Steady Threshold<Warning Threshold<Emergency Threshold

The driver will initially set the Threshold Low Register (TLR) to the threshold that exceeds the physical memory used by least amount. The current memory state is considered to be the state associated with this threshold. When the physical memory used grows to exceed the value in the threshold register, an interrupt will be sent to the device driver. The driver handles the interrupt by re-programming the TLR based upon the rule described above. Interrupts cause the threshold to be moved higher. When the current memory state is either Warning or Emergency, the driver will periodically poll to see if the threshold should be adjusted downward. That is, interrupts move the threshold 'higher'; while polling the memory controller for a reduction in physical memory usage reduces the threshold (relaxation). The threshold associated with the Emergency State is used to program the Threshold High Register (THR). If this threshold is exceeded the memory controller will generate a non-maskable interrupt which when received is used to gracefully shutdown the O/S. Reaching this condition means that physical memory is exhausted and there is only enough left to shut the machine down. This condition is considered a catchall and should not normally be reached.

Memory State Observers

Coupled with the memory state tracking described above, the driver provides the ability for CMS and other client applications (termed Memory State Observers) to be notified as to memory states changes. The mechanism for notifying applications of events is O/S dependent and is known to skilled artisans.

Page Operations

As mentioned, the device driver 20 includes a PageOps module 28 that supports the ability to access the memory operations on pages of physical memory. The key page operation that the driver exposes in terms of compressed memory management is called the Zero Page Operation to user mode applications and is referred to as the Zero Page Op. The application may pass down to the driver a virtual address in its process space and a length. The driver will convert the address from virtual to physical and invoke the Zero Page Operation on each page in the range. This page operation has the effect of flushing the page out of the L3 Cache (if present), freeing any physical memory in use by the page, and writing the trivial data pattern (i.e., zero bit pattern) to the page's CTT entries.

Compression Management Service

The Compression Management Service (CMS) is the user mode portion of the compressed memory control system. It runs as a background process at a priority level above the normal application execution. For example on Windows 2000 it runs at Real-time priority. This is done so that it may pre-empt other user mode process in the system. At its core is the CompMemMgr component 54 which performs the compressed memory management.

Initialization

During initialization CompMemMgr 54 determines the difference (real memory size—physical memory size). This result called MaxMemToTakeAway is the maximum amount of memory that would have to be removed from the Virtual Memory Manager sub-system 77 of the O/S Kernal 75 if an application(s) completely fills memory with incompressible data. Memory is removed from the Virtual Memory Manager 77 via an O/S specific call that allows an application to allocate memory. For example on Windows 2000 it is called VirtualAlloc.

CompMemMgr spawns one or more processes that are called Memory Eaters 60. The number of Memory Eaters processes spawned is calculated by the following formula:

$$\text{NumEaters} = \text{maximum\_of }(\text{MaxMemToTakeAway}/\text{MaxMemoryAllowerPerProcess}, \qquad 1)$$

Note that MaxMemoryAllowedPerProcess is dependent upon the O/S being used.

An interprocess communication (IPC) mechanism is used to allow the CompMemMgr to instruct the Memory Eaters to allocate and release memory and to also allow the Memory Eaters to provide feedback on their progress to the CompMemMgr. Modem O/Ss support many mechanisms to allow processes to communicate with each other. For example in implementing this algorithm for Windows 2000, an area of shared memory is used as the means of communication.

CompMemMgr determines the physical memory thresholds for the Low Physical Memory Interrupt. This is done by summing the size of the size of the Compression Translation Table (CTT), any memory regions that have been setup as uncompressed, size of the resident portion of the O/S kernel, and the size of the L3 cache to back any of the maximum spill over from the L3 cache. After passing the thresholds for each of the memory states down to the driver, it will register itself for notifications from the device driver as the state of memory system changes. These thresholds will be re-calculated by CMS periodically as part of its memory usage monitoring.

Once the interrupt thresholds have been calculated, the MinConsumptionPhysical value is calculated. This variable represents the amount of physical memory that must be in use for CompMemMgr to perform the calculation that determines whether or not a memory adjustment is necessary. It is to be placed at a level of physical memory usage, which is below the point of threshold associated with the Steady State. The actual calculation is an O/S dependent heuristic but in general it is a factor of how much memory is reserved for the warning and emergency states. The MinConsumptionPhysical variable calculation serves two purposes: 1) to get a head start on taking corrective action in advance of the moving into an elevated memory state; and, 2) to function as a watermark that below which any held memory will be returned to the system. It is understood that this value will also be re-calculated along with the memory state thresholds.

Next CompMemMgr spawns and binds one CPU Blocker Thread per processor in the system. As mentioned, the CPU Blockers are utilized when all user (e.g., third-party) applications 65 must be prevented from running.

Figure 2A:
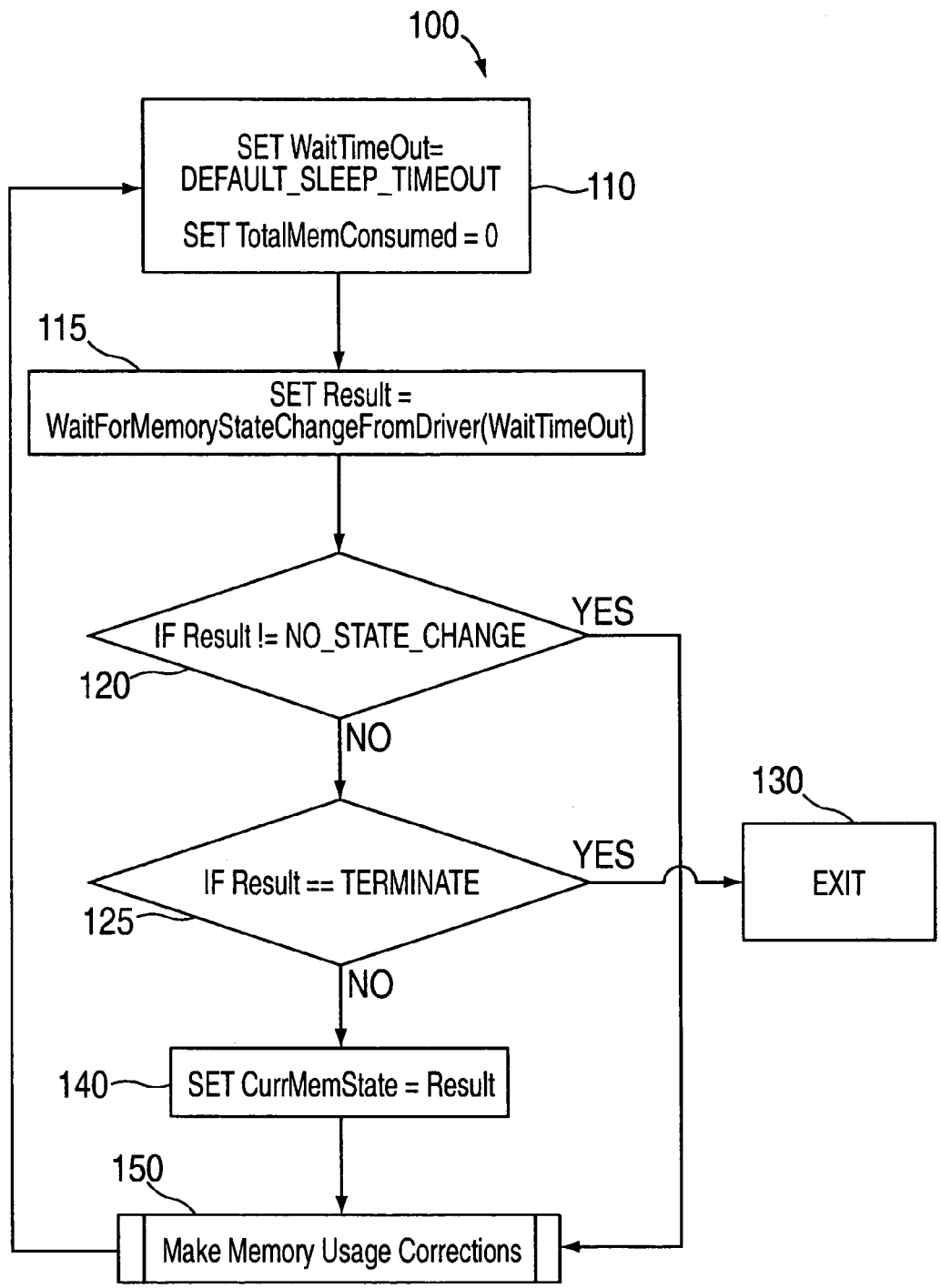
FIGS. 2(a)-2(b) is a flow chart depicting the compressed memory management sub-system algorithm.
Figure 2B:
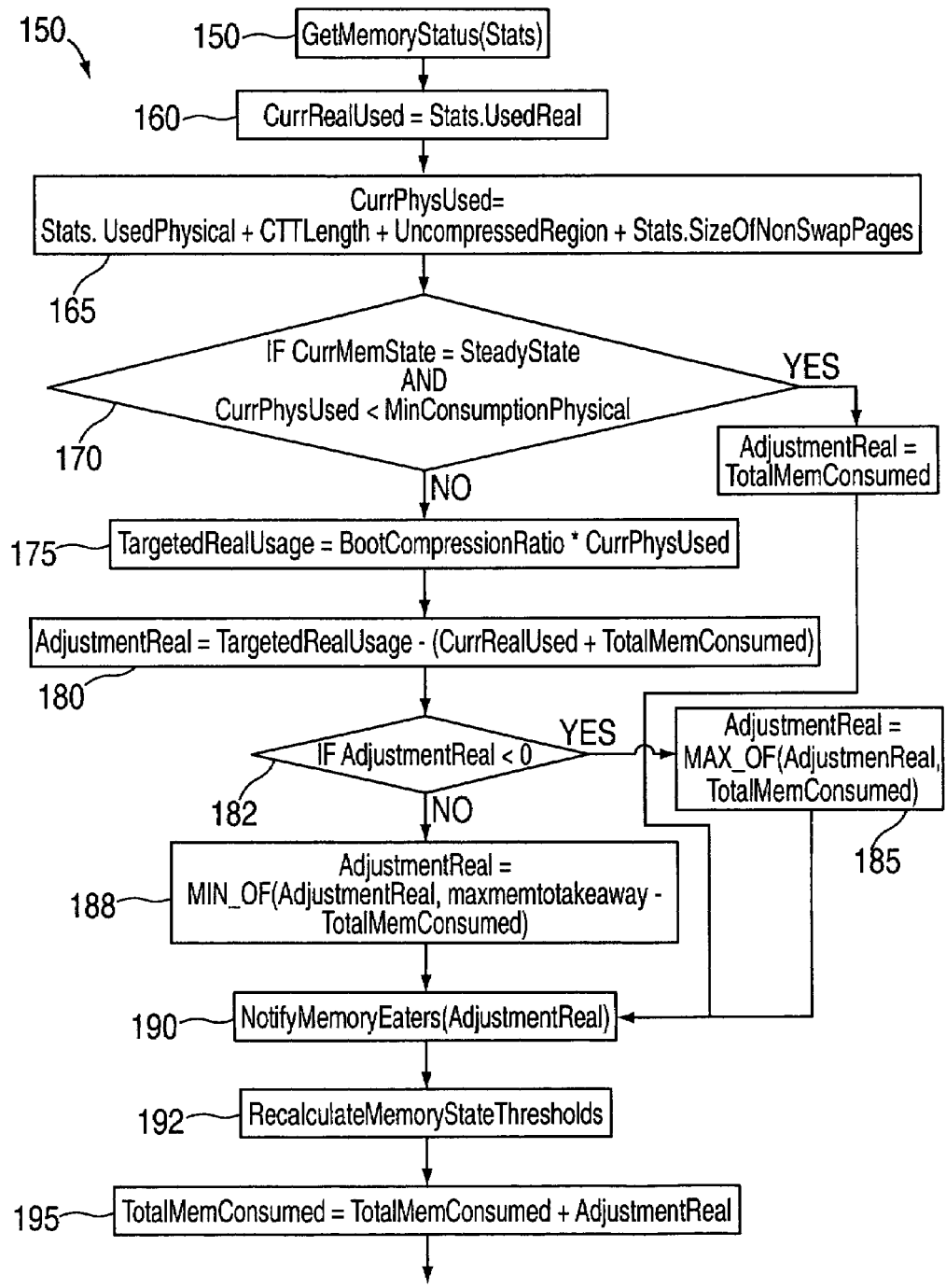

Finally, the CompMemMgr 54 spawns a thread in which it executes the compressed memory management algorithm depicted in FIGS. 2(a)-2(b).

Managing Compressed Memory

FIGS. 2(a)-2(b) is a block diagram illustrating the compressed memory management algorithm.

FIG. 2(a) particularly depicts the main loop 100 of the compressed memory management algorithm which is a loop executed by the CompMemMgr for waiting on one of the memory state notification events from the driver, the terminate event, or a wait timeout value. In a first step 110, the variables WaitTimeOut and TotalMemConsumed are initialized. Particularly, the variable WaitTimeOut is a constant value that is operating system independent and represents a polling interval which is set a default value DEFAULT_SLEEP_TIMEOUT, and may range anywhere between 0 to 1000 msec., for example. As memory pressure increases driving the system into warning and emergency state, the rate of polling is increased. Thus, a WaitTimeOut value of 0 msec means that a WaitForMemoryStateChangeSignalFromDriver function will check for any events being triggered (i.e., a memory state change signal from the driver) and will return immediately. Conversely, when WaitTimeOut is 1000 msec, the WaitForStateChangeSignalFromDriver function will wait for a maximum of a second before returning from the function call so as to yield the processor to other tasks. The variable initial TotalMemConsumed is the memory consumed, and is initially set to zero (0). Then, at step 115, the process waits for a state change signal (interrupt) from the device driver, and sets a variable RESULT equal to the state change value, i.e., WaitForMemoryStateChangeSignalFromDriver(WaitTimeOut). Next, at step 120, a decision is made as to whether a notification event (state change) has been received from the driver. If no state change has occurred, i.e., then the process proceeds to step 150 where the process is invoked for obtaining updated statistics and performing any memory usage correction calculations as described with respect to FIG. 2(b). If there is a state change, a determination is made at step 125 as to whether the change is a terminate event. If the event received is a terminate event, then the process exits at step 130. If a state change has occurred and it was not a terminate event, then the process proceeds to step 140 where the current memory state value is set to the result. The step 150 of gathering of memory usage statistics is then performed and the process repeats by returning to step 110. As will be explained in greater detail, memory usage statistics come from three sources: the Device Driver, the O/S, and randomly selected memory page sampling.

A C++-like pseudocode depiction of the process exemplified by FIG. 2(a) is now provided:

```
void ManageCompressedMemory( )
{
  unsigned long WaitTimeOut = DEFAULT_SLEEP_TIMEOUT;
  MEMUNITS TotalMemConsumed = 0;
  while (1)
  {
    Result =
    WaitForMemoryStateChangeSignalFromDriver(WaitTimeOut);
    if (Result != NO_STATE_CHANGE)
    {
      switch (Signaled)
      {
      case TERMINATE:
        return 0;
      case EMERGENCY:
        WaitTimeOut = 0;
        CurrMemState = EmergencyState;
        break;
      case WARNING:
        WaitTimeOut = 0;
        CurrMemState = WarningState;
        break;
      case STEADY:
        WaitTimeOut = DEFAULT_SLEEP_TIMEOUT;
        CurrMemState = SteadyState;
        break;
      default:
        continue;
```

-continued

```
    }
}
```

FIG. 2(b) particularly depicts the make memory usage corrections process 150 as shown in FIG. 2(a). In the memory usage corrections process loop 150, a first step 155 involves gathering the memory status, i.e., the memory statistics. Then, at step 160, the current real memory (CurrRealUsed) used is computed in accordance with the statistics provided by the device driver. Then, at step 165, the current physical memory (CurrPhysUsed) used is computed. This value includes the size of the physical memory usage plus the size of the Compression Translation Table (CTT) (CTTLength), the size of any defined uncompressed memory regions, and the size of the NonSwappablePages (SizeOfNonSwapPages). Typically the uncompressed memory region is 1 MB and is setup by the BIOS. This is necessary because the physical memory usage reported by the compressed memory controller chip does not account for these values. At the next step 170, an evaluation is made as to whether the current memory state (determined in the main loop 100 of the compressed memory management algorithm) is the steady state AND that the current physical memory computed in step 165 is less than usage is below a minimum usage water mark (MinConsumptionPhysical). If at step 170, it is determined that the current memory state is the Steady State AND the current physical memory computed in step 165 is not less than a minimum threshold, then the process proceeds to step 175 to compute a targeted real memory usage (TargetedRealUsage) representing how the size of memory is to be adjusted. That is, a variable TargetedRealMemoryUse is calculated by multiplying the amount of physical memory in use by the boot compression ratio. To determine the memory adjustment needed, the actual amount of real memory in use plus the total amount of memory already held by the Memory Eaters is subtracted from the TargetedRealMemoryUse. This is the variable AdjustmentReal. A negative result means that the compressibility of the system is equal to or greater than the boot compression ratio. This means that the Memory Eaters should release AdjustmentReal units of memory back to the system. Particularly, based on the amount of physical memory in use, a calculation is made as to how much real memory should be in use which is equal to the boot compression ration of the memory system multiplied by the current physical memory used CurrPhysUsed calculated at step 165. Then at step 180, a value for the real memory adjustment (AdustmentReal) is computed as being equal to the TargetedRealUsage minus a quantity comprising the CurrRealUsed plus the TotalMemConsumed. Then, at step 182, a determination is made as to whether AdjustmentReal<0. If AdustmentReal is less than 0, then the process proceeds to step 185 where the AdustmentReal variable is set equal to max_of(AdjustmentReal, TotalMemConsumed). This is to ensure that there is released only as much available. Particularly, it is desired to release memory slower than it is acquired in case conditions quickly deteriorate. A release ratefactor may be applied to the amount that will be released in any one iteration of memory adjustment.

Returning to step 182, if it is determined that AdjustmentReal is greater than or equal to 0, then the Memory Eaters must allocate Adjustment Units of memory. In doing so the Memory Eater calls the O/S's memory allocation facility for the required memory. The Memory Eater then passes a pointer to the memory its length to the device driver to perform a Zero Page Operation on the all the pages the area contains. These steps are depicted from steps 188, 190, 192 and 195. Particularly, at step 188, the AdustmentReal variable is set equal to min_of(AdjustmentReal, the quantity MaxMemToTakeAway-TotalMemConsumed) where MaxMemToTakeAway is the total real memory to recover in bytes as defined herein. This calculation is made to ensure that the requested adjustment lies within the bounds of what the memory eaters can eat. For example, if MaxMemToTakeAway is 100 Mbytes, AdjustmentReal is 100 Mbytes, and the TotalMemConsumed (the amount that the eaters are already holding) is 25 Mbytes, then the eaters can only hold another 75 Mbytes, i.e., Adjustment is min_of(100, 100-25)= 75 Mbytes. Next, at step 190, the Memory Eaters are put to work by writing the adjustment value into the shared memory block via the monitor. The internal statistics are then updated at steps 192, 195.

A C++-like pseudocode depiction of the process exemplified by FIG. 2(b) is now provided:

```
// Get current memory statistics.
GetMemoryStatus(Stats);
MEMUNITS CurrRealUsed = Stats.UsedReal;
MEMUNITS CurrPhysUsed = Stats.UsedPhysical;
// Add onto the physical memory usage the size of the CTT,
// the size of the uncompressed region, and the size of
// the NonSwappablePages.
CurrPhysUsed = CTTLength + UncompressedRegion +
    Stats.SizeOfNonSwapPages;
// As long as the system is in memory state and the physical memory
// usage is below the minimum usage water mark
// release all the memory held by the memory eaters.
if ((CurrMemState == SteadyState) &&
    (CurrPhysUsed < MinConsumptionPhysical))
{
    // Release all the memory held by the eaters.
    // Except for any guaranteed AWE regions on W2K.
    AdjustmentReal = m_TotalMemConsumed;;
    if (AdjustmentReal < 0)
        AdjustmentReal = 0;
    else
        AdjustmentReal = -AdjustmentReal;
}
else
{
    // Calculate how the size of memory is to be adjusted.
    // Based on the amount of physical memory in use calculate
    // how much real memory should be in use.
    MEMUNITS TargetedRealUsage =
        static_cast<MEMUNITS>(m_BootCompRatio * CurrPhysUsed);
    AdjustmentReal = TargetedRealUsage - (CurrRealUsed +
TotalMemConsumed);
    if (AdjustmentReal < 0)
    {
        // Releasing memory.
        // Want to release memory slower than it is acquired in case
        // conditions quickly deteriorate. Apply a release rate
        // factor to the amount that will be released in any one
        // iteration of memory adjustment.
        MEMUNITS RateAdjusted = AdjustmentReal /
        MemReleaseRate;
        if (0 == RateAdjusted)
        {
            RateAdjusted = AdjustmentReal;
        }
        // Make sure to release only as much as we have.
        AdjustmentReal = max(RateAdjusted, -TotalMemConsumed);
    }
    else
    {
        // Consuming memory.
        AdjustmentReal = min(MaxMemToTakeAway -
        TotalMemConsumed, AdjustmentReal);
    }
```

-continued

```
    }
    // Put the eaters to work by writing the adjustment value into the
    // shared memory block via the monitor.
    NotifyMemoryEaters(AdjustmentReal);
    If (ReCalculateMemoryStateThresholds( ))
        SetMemoryStateThresholds( );
    // Update our internal stats.
    TotalMemConsumed += AdjustmentReal;
  }
}
```

Warning and Emergency States

If CompMemMgr is notified of the Warning or Emergency state being entered, it will switch the timeout for the next iteration to 0. This is done so that as much CPU time as possible may be spent on CompMemMgr analyzing memory conditions and on the Memory Eaters compensating for the memory condition. Recall that there is also one CPU Blocker thread per processor waiting on a signal from the driver indicating that the memory usage has moved into the Emergency State. Once the CPU Blocker is notified of the Emergency condition it will hog the CPU it is bound to. This has the effect of blocking all other user applications from running which is necessary because once the system enters the Emergency State it is getting very close to running out of physical memory. Allowing user applications to run might further deteriorate memory conditions causing the machine to stop running. The CPU Blocker runs at the priority level just below CompMemMgr and the Memory Eaters. This allows the compressed memory management to pre-empt the blocker threads but also allow the blocker threads to block other user mode applications. The CPU Blocker threads will stop "hogging" the CPU when it is signaled that the memory system has moved back into the Steady or Warning State. It is than safe to allow other applications to continue running.

Adjusting Priorities

The O/S itself has threads that run at high priority normal or higher. These threads are not problematic for the compression controls because they run for very short durations and cannot change the overall compressibility of the system. However, it is possible for other applications to be run at priority levels which are higher than the compression controls for long durations, which in theory can be problematic for the compression controls. It should be noted that applications running at these priority levels do not yield the CPU could interfere with the normal operation of the Virtual Memory Manager itself and cause the O/S to behave erratically. One way to avoid having these applications interfere with the compression control software is to have the controls dynamically lower the process priority (or suspend the process entirely) while in the Emergency State. The priority may be restored after the crisis has been rectified.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

The invention claimed is:

1. In a computer system having an operating system (O/S) and a compressed main memory defining a physical memory and a real memory characterized as fixed amount of main memory as seen by a processor, and including a compressed memory hardware controller device for controlling processor access to said compressed main memory, a method for managing real memory usage comprising the steps of:

receiving real memory usage information from said compressed memory hardware controller, said information including a characterization of said real memory usage state;

executing application in non-O/S kernel mode as a background process at a real-time priority level for monitoring said memory usage and initiating memory allocation and memory recovery within an operating system memory space including freeing up of physical memory from the operating system by swapping out pages of memory associated with lower priority tasks when physical memory availability is below at least one memory usage state threshold, and, the recovery of physical memory to the operating system such that there always is enough physical memory in which to include application and O/S data; and, adjusting said memory usage thresholds for controlling memory state changes, whereby control of said real memory usage in said computer system is accomplished without modification to an operating system kernel and transparent to said operating system.

2. The method for managing real memory usage as claimed in claim 1, further including the step of generating an interrupt indicating memory usage exceeding a physical real memory usage threshold, said characterization of said real memory usage including a memory state set according to an amount of physical memory used.

3. The method for managing real memory usage as claimed in claim 2, wherein said memory controller hardware includes one or more threshold registers associated with a physical memory usage threshold, said interrupt being generated when a usage threshold value is exceeded.

4. The method for managing real memory usage as chimed in claim 1, further including the step of adjusting said physical memory usage threshold value in accordance with a current memory usage state.

5. The method for managing real memory usage as claimed in claim 4, wherein a current memory usage threshold value includes a value associated with a memory state including one of a steady state, warning state and emergency state, wherein said threshold values for each state are governed according to:

steady state threshold<warning threshold<emergency threshold.

6. The method for managing real memory usage as claimed in claim 5, further including the step of generating one or more memory eater processes for performing one of: allocating to or releasing said memory from said system.

7. The method for managing real memory usage as claimed in claim 6, further including the step of determining a number of memory eater processes to be generated based upon a total real memory amount to recover from said system.

8. The method for managing real memory usage as claimed in claim 7, further including the step of determining an adjustment amount comprising the amount of physical memory that needs to be allocated or released, said adjustment amount based on a boot compression ratio of said system.

9. The method for managing real memory usage as claimed in claim 6, further including the step of generating one or more blocker processes for association with a single processor operating in said system, each blocker process binding to an associated processor and monopolizing processor time to prevent other applications running in said system from executing when memory usage exceeds said emergency state threshold.

10. The method for managing real memory usage as claimed in claim 6, wherein a memory eater process performs a step of removing memory from the system and replace the data in virtual pages of memory with a highly compressible data, thereby controlling average compressibility of all real memory.

11. The method for managing real memory usage as claimed in claim 1, further including the step of broadcasting low physical memory usage interrupts to client applications running on said computer system.

12. The method for managing real memory usage as claimed in claim 1, wherein a memory state includes one of a steady state, warning state and emergency state according to said thresholds, said method further including polling said memory controller hardware to determine if a threshold should be readjusted downward when in said warning state and emergency state.

13. The method for managing real memory usage as claimed in claim 1, further including the step of setting a memory usage threshold.

14. The method for managing real memory usage as claimed in claim 1, further including the step of allocating one or more pages of memory at a time.

* * * * *